(12) United States Patent
Liu et al.

(10) Patent No.: US 8,638,304 B2
(45) Date of Patent: Jan. 28, 2014

(54) TOUCH SENSING METHOD AND ASSOCIATED APPARATUS BASED ON DISPLAY PANEL COMMON VOLTAGE

(75) Inventors: Chi Kang Liu, Hsinchu Hsien (TW); Chin-Wei Lin, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 266 days.

(21) Appl. No.: 12/838,567

(22) Filed: Jul. 19, 2010

(65) Prior Publication Data

US 2011/0012854 A1    Jan. 20, 2011

(30) Foreign Application Priority Data

Jul. 20, 2009  (TW) .............................. 98124451 A

(51) Int. Cl.
*G06F 3/041* (2006.01)
(52) U.S. Cl.
USPC ........................................................ 345/173
(58) Field of Classification Search
USPC ........................................................ 345/173
See application file for complete search history.

(56) References Cited

U.S. PATENT DOCUMENTS

| | | | | |
|---|---|---|---|---|
| 5,410,329 | A * | 4/1995 | Tagawa et al. ................ | 345/104 |
| 5,448,024 | A * | 9/1995 | Kawaguchi et al. ....... | 178/18.07 |
| 2004/0217945 | A1 * | 11/2004 | Miyamoto et al. ............ | 345/173 |
| 2004/0227743 | A1 * | 11/2004 | Brown .......................... | 345/204 |
| 2006/0132463 | A1 * | 6/2006 | Lee et al. ...................... | 345/173 |
| 2006/0201931 | A1 * | 9/2006 | Lee et al. ...................... | 219/497 |
| 2007/0034423 | A1 * | 2/2007 | Rebeschi et al. ........... | 178/18.06 |
| 2007/0091078 | A1 * | 4/2007 | Park et al. ..................... | 345/173 |
| 2007/0262966 | A1 * | 11/2007 | Nishimura et al. ........... | 345/173 |
| 2008/0198140 | A1 * | 8/2008 | Kinoshita et al. ............. | 345/173 |
| 2009/0073138 | A1 * | 3/2009 | Lee et al. ...................... | 345/173 |
| 2009/0115737 | A1 * | 5/2009 | Toyoshima .................... | 345/173 |
| 2010/0110029 | A1 * | 5/2010 | Yamamoto et al. ........... | 345/173 |
| 2010/0214259 | A1 * | 8/2010 | Philipp et al. ................. | 345/174 |
| 2010/0289765 | A1 * | 11/2010 | Noguchi et al. ............... | 345/173 |
| 2010/0295824 | A1 * | 11/2010 | Noguchi et al. ............... | 345/175 |
| 2010/0328256 | A1 * | 12/2010 | Harada et al. ................. | 345/174 |
| 2010/0328259 | A1 * | 12/2010 | Ishizaki et al. ................ | 345/174 |
| 2011/0050605 | A1 * | 3/2011 | Pan et al. ...................... | 345/173 |
| 2011/0267296 | A1 * | 11/2011 | Noguchi et al. ............... | 345/173 |

\* cited by examiner

*Primary Examiner* — Chanh Nguyen
*Assistant Examiner* — Robert Stone
(74) *Attorney, Agent, or Firm* — Edell, Shapiro & Finnan, LLC

(57) ABSTRACT

A touch screen includes an LCD panel; a display controller for processing a video signal to generate a panel control signal and a sensing control signal, with the panel control signal controlling the LCD panel so that the LCD panel displays images according to the panel control signal; a touch panel, for generating the sensing signal in response to a touch; and a sensing circuit, coupled to the touch panel and the display controller, for receiving the sensing signal and the sensing control signal to generate a position signal with reference to the sensing control signal.

19 Claims, 8 Drawing Sheets

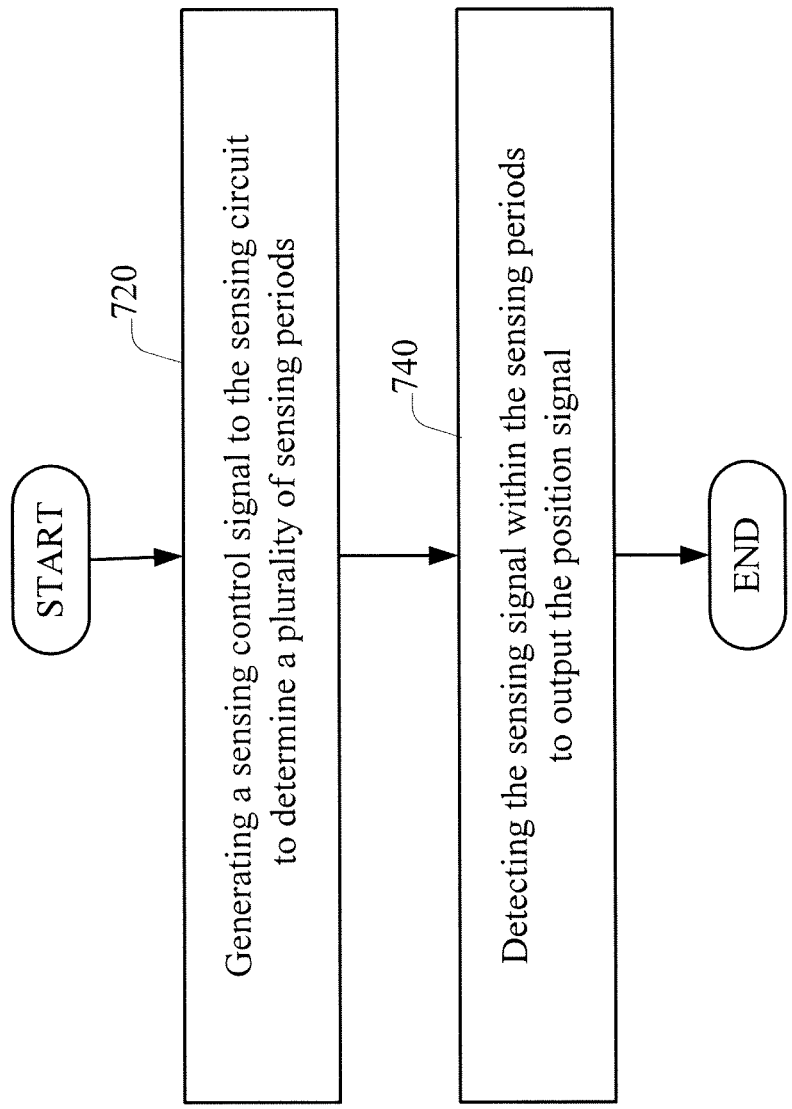

TOUCH SENSING METHOD AND ASSOCIATED APPARATUS BASED ON DISPLAY PANEL COMMON VOLTAGE

CROSS REFERENCE TO RELATED PATENT APPLICATION

This patent application is based on Taiwan, R.O.C. patent application No. 98124451 filed on Jul. 20, 2009.

FIELD OF THE INVENTION

The present invention relates to a touch sensing method and associated apparatus, and more particularly to a touch sensing method for a capacitive touch screen and associated apparatus.

BACKGROUND OF THE INVENTION

FIG. 1 is a conventional touch screen. The touch screen comprises a liquid crystal display (LCD) panel 100, a touch panel 150, a display controller 130 and a sensing circuit 155. In general, the touch panel 150 is fabricated on the LCD panel 100. The display controller 130 receives a video signal and converts the video signal to a panel control signal transmitted to the LCD panel 100 so that the LCD panel 100 displays the image according to the panel control signal. When one touches the touch panel 150, the touch panel 150 generates a sensing signal to the sensing circuit 155, and the sensing circuit 155 outputs a position signal according to the sensing signal.

FIG. 2A is a diagram of the LCD panel. The LCD panel 100 is generally divided into two regions—a display region 112 and a non-display region 114. The display region 112 comprises a thin film transistor (TFT) array, and the non-display region 114 comprises a gate driver 120 and a source driver 125 for controlling transistors in the TFT array. The panel control signal outputted from the display controller 130 controls the gate driver 120 to generate a gate driving signal and the source driver 125 to generate a source driving signal. The panel control signal further comprises a common voltage signal Vcom for controlling the inversion of liquid crystal in the LCD panel 100. The gate driving signal controls the TFT array to turn on or off, and the source driving signal provides brightness data for pixels. In FIG. 2A, in a portable electronic device application, the display controller 130 can be integrated with a timing controller (TCON), the gate driver 120 and the source driver 125.

The video signal comprises a vertical synchronization signal Vsync, a horizontal synchronization signal Hsync, a red signal, a green signal and a blue signal. The time to display a scan line on the LCD panel 100 is a period associated with the horizontal synchronization signal Hsync, while the time to display a frame on the LCD panel 100 is a period associated with the vertical synchronization signal Vsync. That is, if the LCD panel 100 has M scan lines, the gate driver 120 can generate M gate driving signals. According to the horizontal synchronization signal Hsync, M gate driving signals can be asserted sequentially.

FIG. 2B is a diagram of the vertical synchronization signal Vsync, the horizontal synchronization signal Hsync, the common voltage signal Vcom and the gate driving signal. As shown in FIG. 2B, the period of the vertical synchronization signal Vsync begins from the start of the low level, and one period of the vertical synchronization signal Vsync comprises a plurality of periods of the horizontal synchronization signal Hsync. According to the horizontal synchronization signal Hsync, a plurality of gate driving signals are asserted sequentially, and a frequency of the common voltage signal Vcom is a half of a frequency of the horizontal synchronization signal Hsync. As mentioned above, in a portable electronic device application, the display controller 130 can be integrated with the timing controller, the gate driver 120 and the source driver 125, with the Vcom signal residing in the integrated display controller 130.

The low level interval of the vertical synchronization signal Vsync is known as a vertical blanking interval (VBI). During the VBI, the common voltage signal Vcom also remains at the low level.

FIG. 3 shows a conventional capacitive touch panel. The capacitive touch panel comprises a first sensing layer 151, a second sensing layer 152 and a shielding layer 153. Generally, the first sensing layer 151 and the second sensing layer 152 respectively comprise a plurality of capacitive sensing components. When one touches the capacitive touch panel, equivalent capacitance of the touch point is changed.

Moreover, the shielding layer 153 isolates the panel control signal from the sensing signal so that the sensing signal is not affected by noise from the panel control signal. Accordingly, the display controller 130 and the sensing circuit 155 in the conventional capacitive touch screen operate separately without communication. The conventional three-layered capacitive touch panel is much more costly than a resistive touch panel.

SUMMARY OF THE INVENTION

The present invention provides a touch sensing method and associated apparatus applied to a capacitive touch screen, so that the capacitive touch panel in the capacitive touch screen requires no shielding layer to generate a position signal correctly.

More specifically, the present invention provides a touch screen comprising an LCD panel; a display controller, for processing a video signal to generate a panel control signal and a sensing control signal, with the panel control signal controlling the LCD panel so that the LCD panel displays an image according to the panel control signal; a touch panel, for generating a sensing signal in response to a touch; and a sensing circuit, coupled to the touch panel and the display controller, for receiving the sensing signal and the sensing control signal to generate a position signal with reference to the sensing control signal.

Therefore, the present invention provides a touch sensing method for sensing a touch point on the touch panel to output the position signal. The touch sensing method comprises generating a sensing control signal to a sensing circuit so that the sensing circuit accordingly determines a plurality of sensing periods; and within the sensing periods, detecting a sensing signal by the sensing circuit to output the position signal.

BRIEF DESCRIPTION OF THE DRAWINGS

The present invention will become more readily apparent to those ordinarily skilled in the art after reviewing the following detailed description and accompanying drawings, in which:

FIG. 7 is a flowchart of a touch sensing method according to an embodiment of the present invention.

DETAILED DESCRIPTION OF THE PREFERRED EMBODIMENT

In a conventional capacitive touch screen, a display controller and a sensing circuit operate separately, and signals between them are isolated by a shielding layer. However, when the shielding layer is removed from a touch panel, a panel control signal becomes very noisy to a sensing signal, such that the sensing circuit fails to generate a correct position signal. A main reason for incurring excessive noise in the sensing signal is a common voltage signal Vcom. Since the amplitude of the common voltage signal Vcom is between 3V and 5V, transitions between high and low levels of the common voltage signal Vcom causes noise that is then coupled to the sensing signal.

Figure 1:
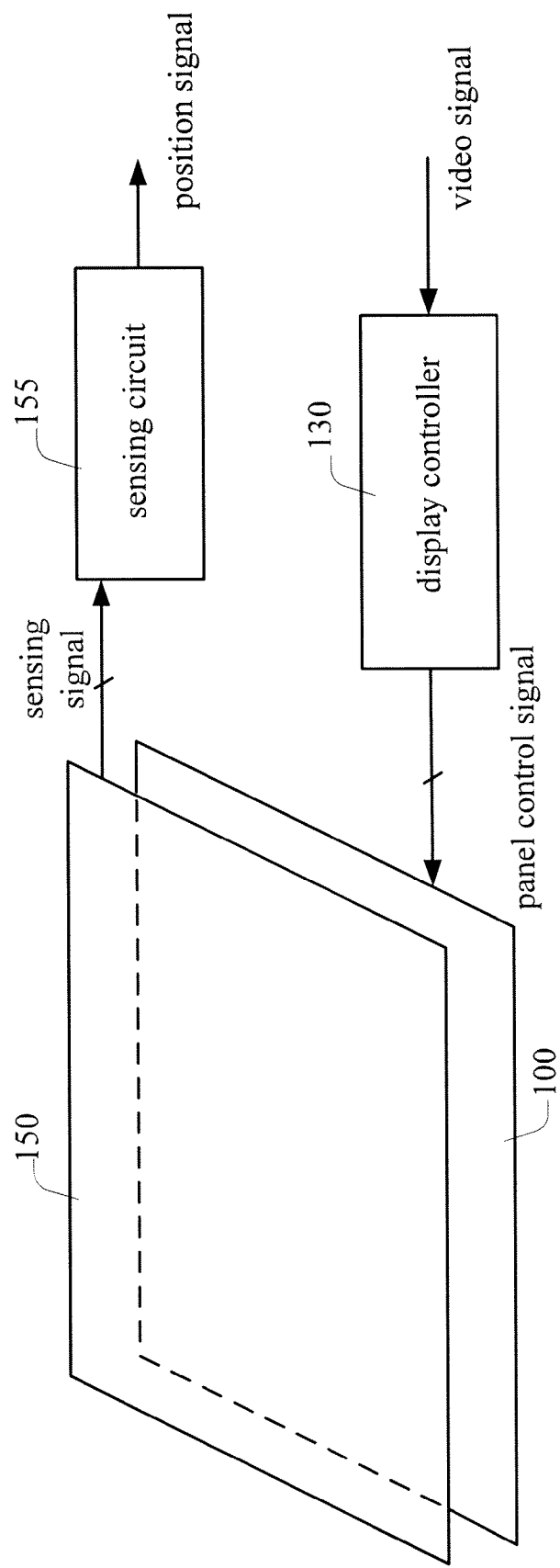
FIG. 1 is a conventional touch screen.
Figure 2A:
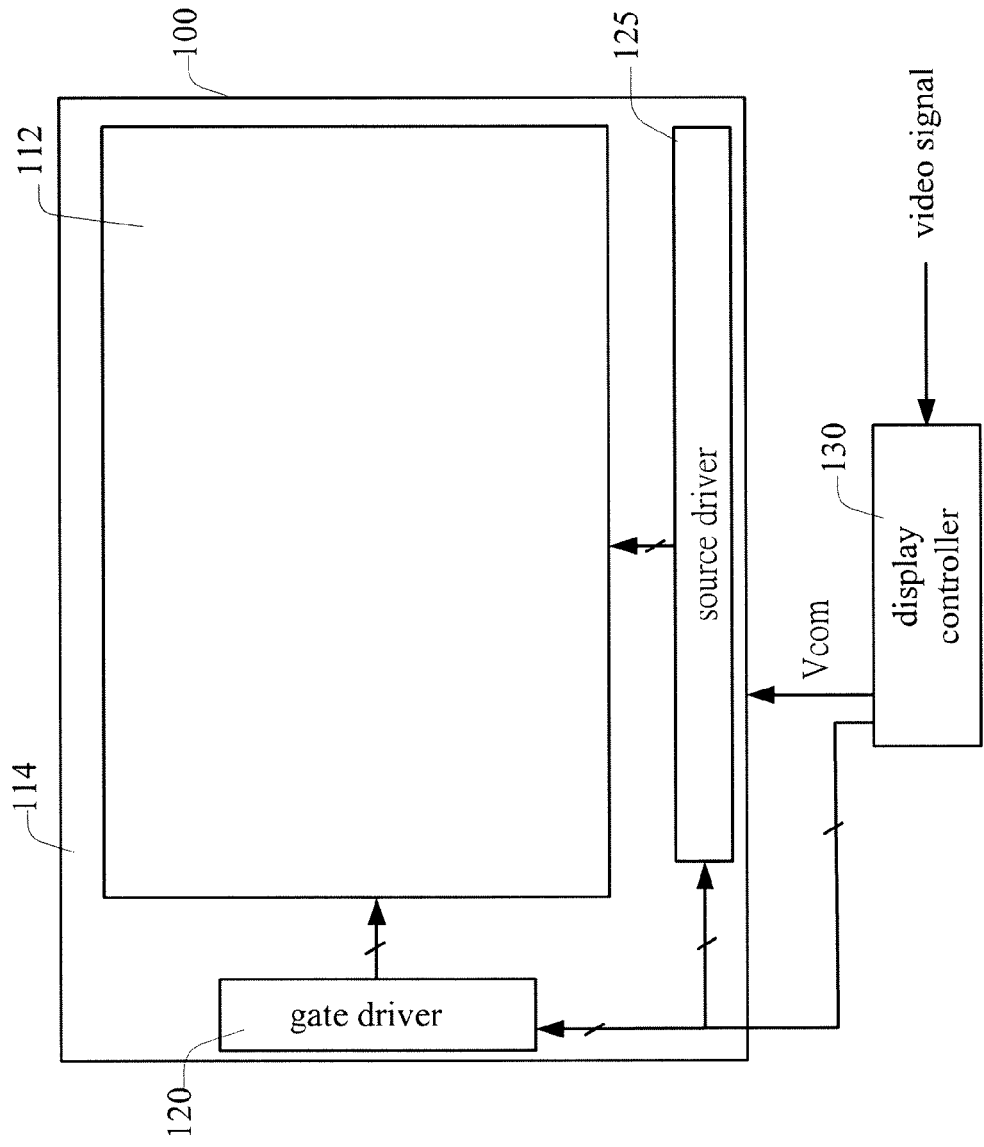
FIG. 2A is a diagram of an LCD panel according to the prior art.
Figure 2B:
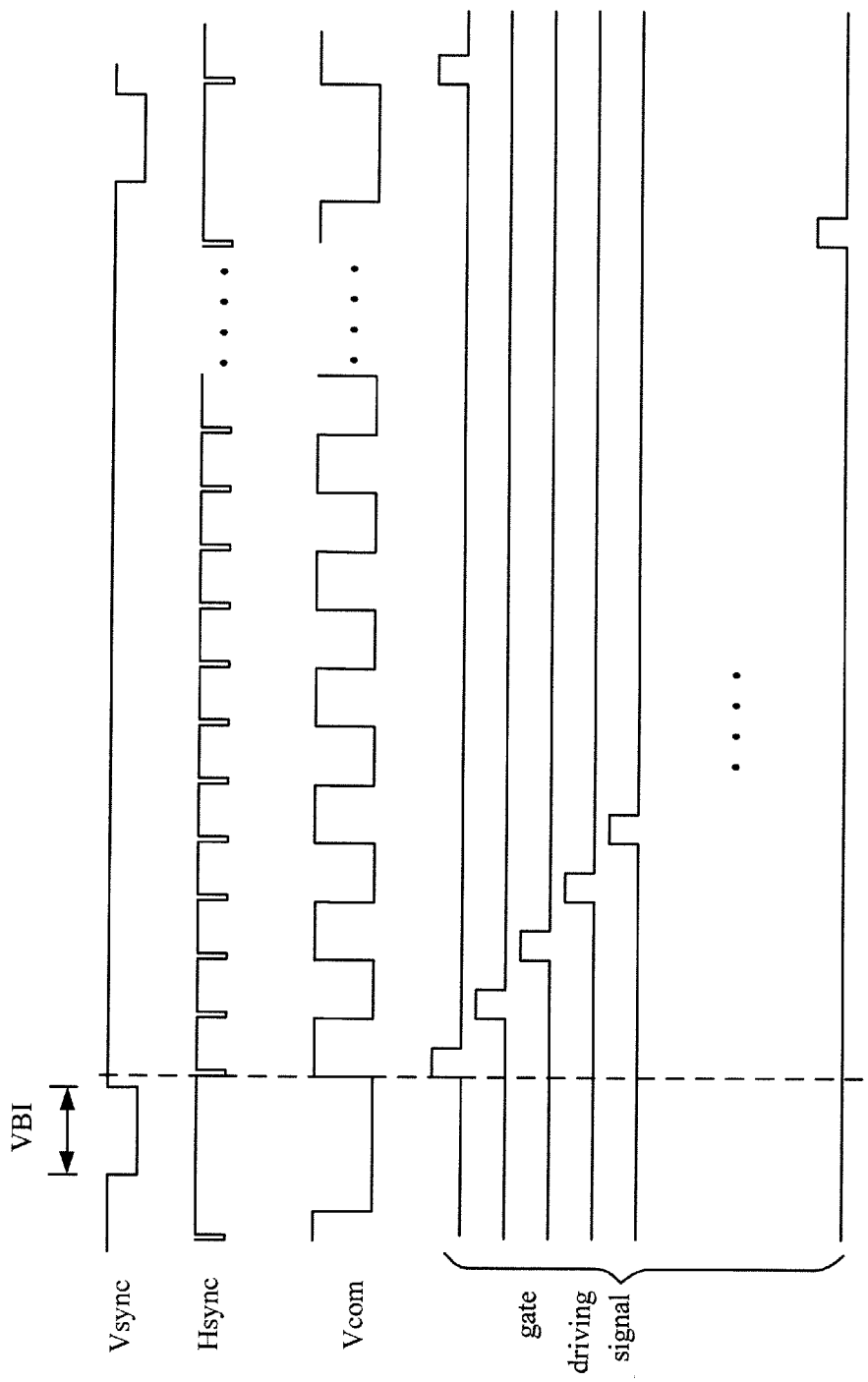
FIG. 2B is a diagram of a vertical synchronization signal Vsync, a horizontal synchronization signal Hsync, a common voltage Vcom and a gate driving signal according to the prior art.
Figure 3:
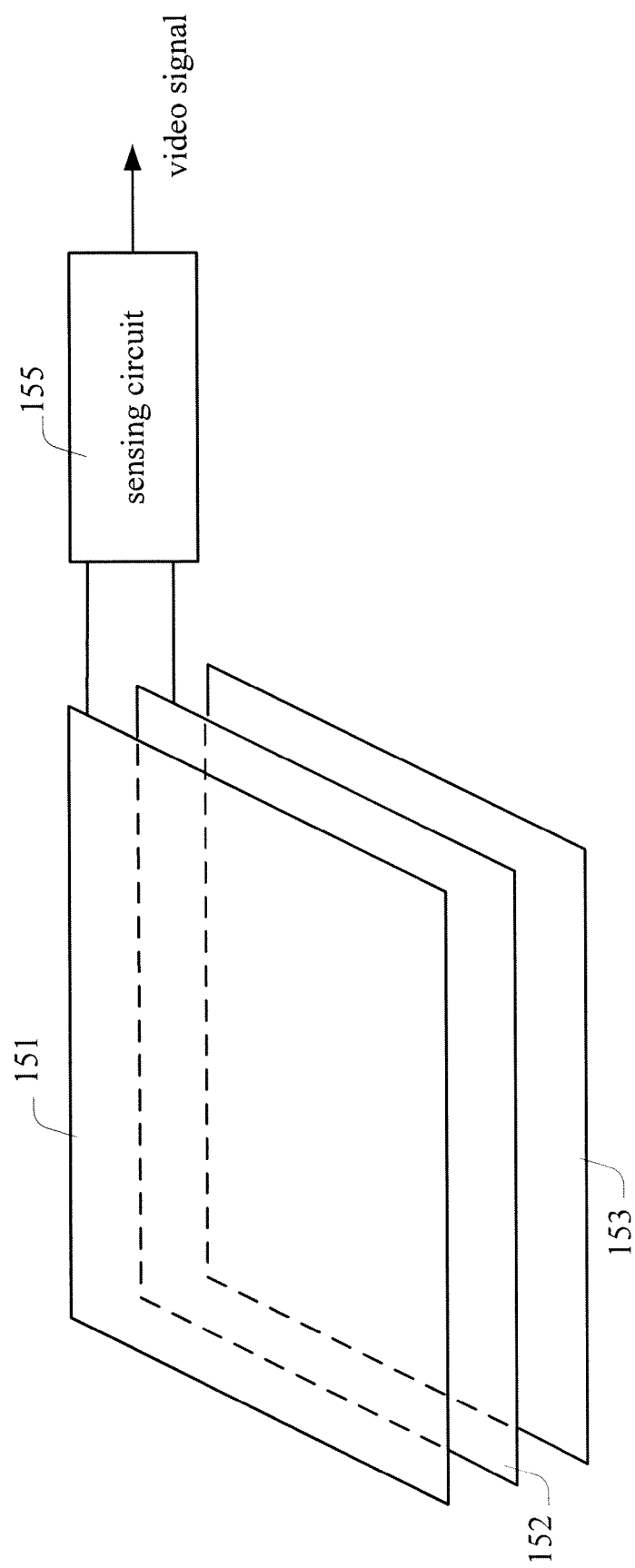
FIG. 3 is a diagram of a conventional capacitive touch panel.
Figure 4:
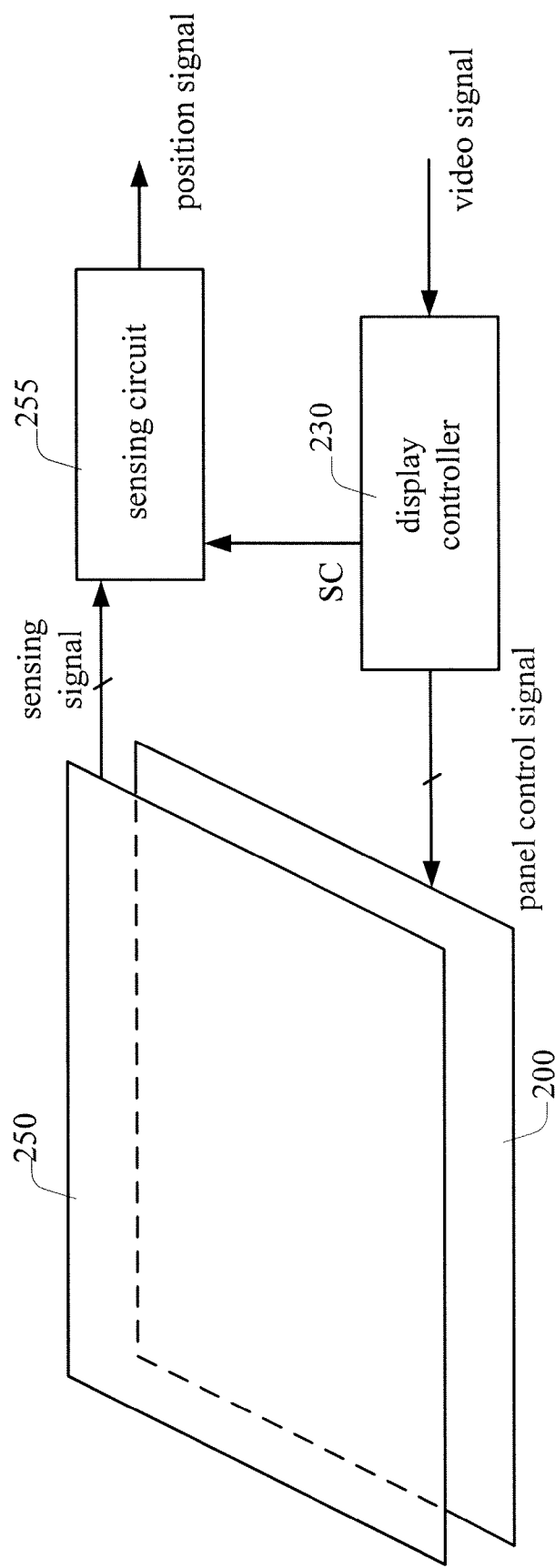
FIG. 4 is a touch screen according to one embodiment of the present invention.

FIG. 4 is a touch screen according to one embodiment of the present invention. The touch screen comprises a liquid crystal display (LCD) panel 200, a display controller 230, a touch panel 250 and a sensing circuit 255. In this embodiment, the display controller 230 receives a video signal, outputs a panel control signal to the panel 200 and further outputs a sensing control (SC) signal to the sensing circuit 255. The sensing circuit 255 determines a sensing period according to the SC signal. The sensing circuit 255 detects the sensing signal to generate the position signal within a sensing period. It is noted that the touch panel 250 is a capacitive touch panel and no shielding layer is required. In this embodiment, the sensing control SC signal and the common voltage signal Vcom are in-phase. For example, when the common voltage signal Vcom is at a high level, the sensing control signal SC is also at a high level, and when the common voltage signal Vcom is at a low level, the sensing control signal SC is also at a low level. The display controller 230 can be integrated with a timing controller, a gate driver and a source driver. The display controller 230 outputs the sensing control signal SC to the sensing circuit 255 so that the sensing circuit 255 determines a sensing period to detect the sensing signal and output a position signal as a result. Thus, the sensing circuit 255 can remove the noise in the sensing signal and output the correct position signal.

Figure 5:
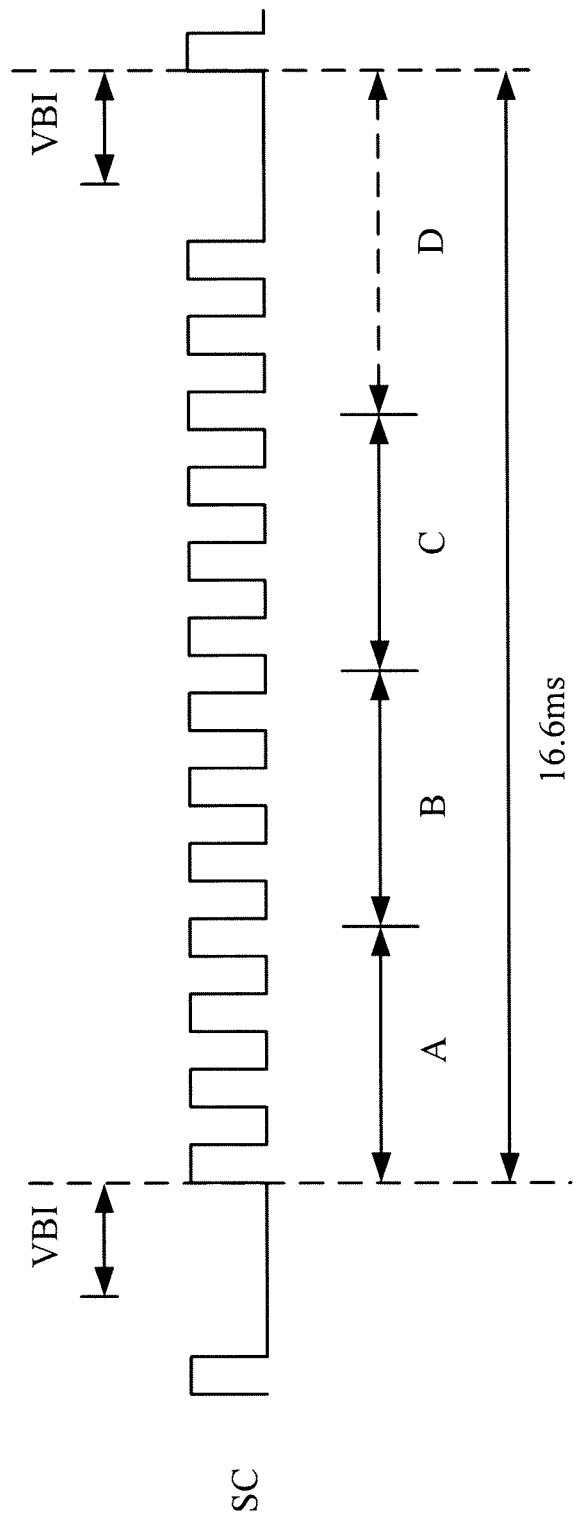
FIG. 5 is a sensing period according to a first embodiment of the present invention.

FIG. 5 is a sensing period according to one embodiment of the present invention. When a frame rate is 60 frame/sec, the period for displaying one frame is around 16.6 ms. Supposing the sensing time of the capacitive touch panel is 4 ms, the sensing circuit 255 is notified of the start time of each frame by the SC signal and determines the sensing period from the frame starting time. In FIG. 5, after the VBI, a first pulse of the SC signal is selected as the frame starting time, and the sensing control signal SC comprises four zones, i.e., A, B, C and D. The variation in the Vcom signal in the three zones A, B and C is the same. Hence, the three zones A, B and C can be selected as the sensing period. The sensing circuit 255 can remove the noise of the sensing signal and output the correct position signal. Since the zone D encompasses the VBI, its variation in the common voltage signal Vcom is different from those of the three zones A, B and C. Thus, the zone D is discarded.

Figure 6:
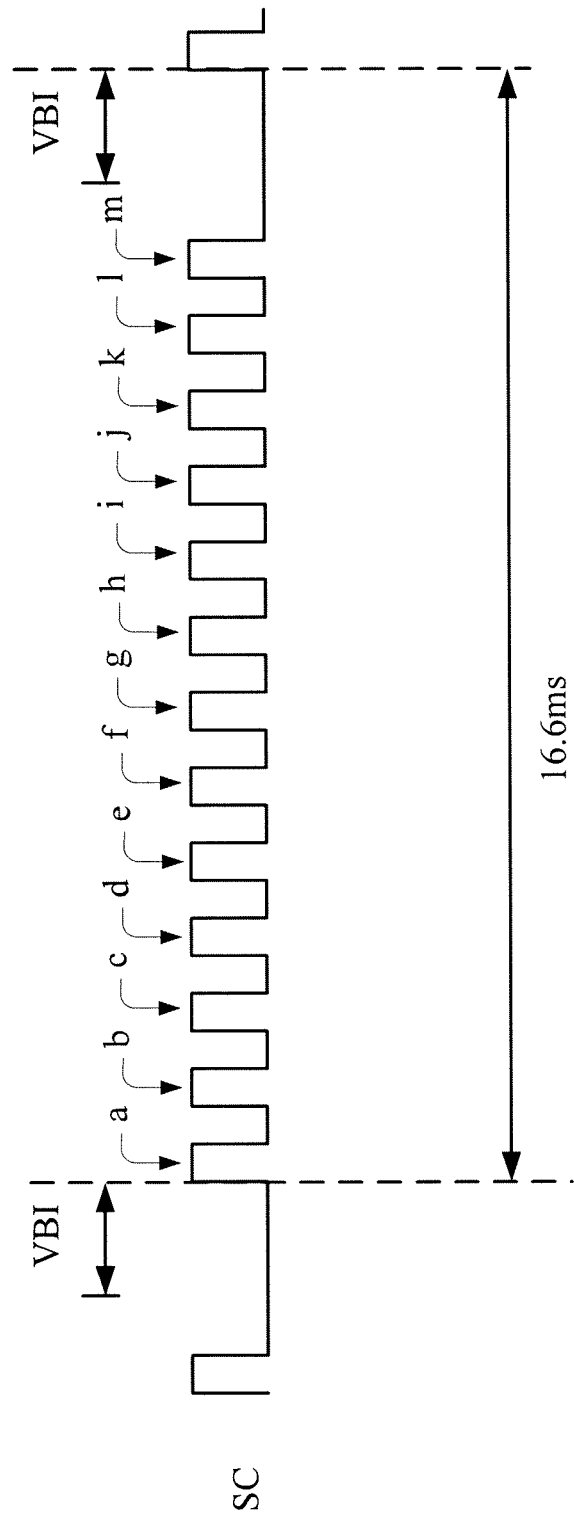
FIG. 6 is a sensing period according to a second embodiment of the present invention.

FIG. 6 is a sensing period according to another embodiment of the present invention. In this embodiment, the sensing control signal SC and the common voltage signal Vcom are in-phase. When the frame rate is 60 frame/sec, the period for displaying one frame is around 16.6 ms, and the pulse width of the SC signal is about 30 to 40 µs. Suppose each sensing period of the capacitive touch panel requires 5 µs. For example, the sensing circuit 255 is embedded with a delta-sigma analog to digital converter (ADC) for an in-situ detection, the sensing circuit 255 is notified of the start time of each frame by the sensing control SC, and the high levels of the sensing control SC (a to m) are determined as proper sensing periods. Preferably, each sensing period has a guarding period to avoid an unstable zone of the signal transition period. For example, each signal transition is designated with a protection zone having a predetermined time length to avoid the guarding period before the actual detection begins. From FIG. 6, after the VBI, the first pulse of the sensing control signal SC can be viewed as the start time of the frame, and the high level of the sensing control signal SC serves as the sensing period. Therefore, within the sensing periods (a to m), the common voltage signal Vcom remains at the high level, and the sensing circuit 255 removes the noise of the sensing signal with reference to the sensing control signal SC to output the correct position signal. Alternatively, the sensing circuit 255 can also use the low level of the sensing control signal SC as the sensing period. That is, the sensing control signal SC in the first and second embodiment is associated with the common voltage signal Vcom. According to the above embodiment, those skilled in the art can use the vertical synchronization signal Vsync, the horizontal synchronization signal Hsync, the red signal, the green signal or the blue signal in the display controller 230 to generate the sensing control signal SC indicating the start time of the frame to the sensing circuit 255, which then determines the sensing period with reference to the sensing control signal SC. Alternatively, the display controller 230 generates the sensing control signal SC capable of indicating the start time of the frame to the sensing circuit 255 for determining the sensing period.

FIG. 7 is a flowchart of a touch sensing method for sensing the touch point to output a position signal according to one embodiment of the present invention. The touch panel comprises a first sensing layer and a second sensing layer without a shielding layer. In Step 720, a sensing control signal is generated to the sensing circuit, which then accordingly determines a plurality of sensing periods. Preferably, each sensing period has one guarding period. Preferably, the sensing period resides in a non-VBI area. In Step 740, the sensing signal is detected within the sensing periods to output the position signal. For example, the sensing control signal SC is capable of indicating a start time of a frame according to, for example, a vertical synchronization signal Vsync, a horizontal synchronization signal Hsync, a red signal, a green signal or a blue signal.

To sum up, the present invention provides a touch screen comprising an LCD panel; a display controller, for processing a video signal to generate a panel control signal and a sensing control signal, with the panel control signal controlling the LCD panel so that the LCD panel displays images according to the panel control signal; a touch panel, for generating a sensing signal in response to a touch; and a sensing circuit, coupled to the touch panel and the display controller, for receiving the sensing signal and the sensing control signal to generate a position signal with reference to the sensing control signal.

The present invention also provides a touch sensing method for sensing a touch point on a touch panel to output a position signal. The touch sensing method comprises generating a sensing control signal to a sensing circuit that then accordingly determines a plurality of sensing periods; and within the sensing periods, detecting a sensing signal by the sensing circuit to output the position signal.

Hence, the present invention provides a touch sensing method and associated apparatus applied to the capacitive touch screen to offer an advantage that the capacitive sensing panel in the capacitive touch screen need not be provided with the shielding layer and the sensing signal is detected within the sensing periods to determine the correct position signal.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch screen, comprising:
    an LCD panel;
    a display controller, for processing a video signal comprising a vertical synchronization signal and a horizontal synchronization signal to generate a panel control signal and a sensing control signal, with the panel control signal controlling the LCD panel so that the LCD panel displays a plurality of images according to the panel control signal, wherein each of the plurality of images is displayed in a plurality of scan lines according to the horizontal synchronization signal and a common voltage (Vcom) signal undergoes a digital transition between the display of each of the plurality of scan lines;
    a touch panel, for generating a sensing signal in response to a touch; and
    a sensing circuit, coupled to the touch panel and the display controller, for receiving the sensing signal and the sensing control signal to generate a position signal while the display controller is displaying the plurality of scan lines with reference to the sensing control signal,
    wherein the sensing circuit determines a plurality of sensing periods according to the sensing control signal and detects the sensing signal within the sensing periods, wherein each of the plurality of sensing periods includes a period of time needed to display at least two scan lines from the plurality of scan lines, and
    wherein the sensing circuit is configured to ignore the sensing signal during a predetermined sensing period of a frame corresponding to a time period during which variation of the common voltage (Vcom) signal supplied to the LCD panel is different from a plurality of other equally long sensing periods from the plurality of sensing periods of the frame, each of the other equally long sensing periods having an identical variation of the common voltage (Vcom) signal, and
    wherein the predetermined sensing period, which is ignored by the sensing circuit, includes a vertical blanking interval determined by the vertical synchronization signal.

2. The touch screen according to claim 1, wherein the touch panel comprises a first sensing layer and a second sensing layer.

3. The touch screen according to claim 1, wherein the video signal further comprises a red signal, a green signal and a blue signal.

4. The touch screen according to claim 3, wherein the sensing control signal indicates a start time of a frame according to the vertical synchronization signal, the horizontal synchronization signal, the red signal, the green signal or the blue signal.

5. The touch screen according to claim 4, wherein the sensing circuit determines the sensing periods according to the start time of the frame and detects the sensing signal within the sensing periods.

6. The touch screen according to claim 1, wherein the display controller comprises a timing controller, a gate driving circuit and a source driving circuit.

7. The touch screen according to claim 1, wherein the sensing control signal indicates a start time of a frame.

8. The touch screen according to claim 7, wherein the sensing circuit determines the sensing periods according to the start time of the frame and detects the sensing signal within the sensing periods.

9. The touch screen according to claim 1, wherein the sensing control signal is synchronized with the common voltage (Vcom) signal.

10. The touch screen according to claim 1, wherein the sensing circuit comprises a delta-sigma analog-to-digital converter for receiving the sensing signal and performing an in-situ detection on the sensing signal.

11. The touch screen according to claim 1, wherein each sensing period has a guarding period.

12. The touch screen according to claim 1, wherein the sensing control signal and the common voltage (Vcom) signal are in phase.

13. A touch sensing method, for sensing a touch point on a touch panel to output a position signal, comprising:
    generating and supplying a sensing control signal to a sensing circuit to determine a plurality of sensing periods, wherein the sensing control signal corresponds to a common voltage (Vcom) signal that undergoes a digital transition between displaying each of a plurality of scan lines, and wherein each of the plurality of sensing periods includes a period of time needed to display at least two scan lines from the plurality of scan lines; and
    while displaying the plurality of scan lines, detecting a sensing signal by the sensing circuit to output the position signal within the sensing periods,
    wherein the sensing circuit is configured to ignore the sensing signal during a predetermined sensing period which includes a vertical blanking interval of a frame corresponding to a time period during which variation of the common voltage (Vcom) signal is different from a plurality of other equally long sensing periods from the plurality of sensing periods of the frame, each of the other equally long sensing periods having an identical variation of the common voltage (Vcom) signal, and
    wherein the predetermined sensing period includes a vertical blanking interval.

14. The touch sensing method according to claim 13, wherein the touch panel comprises a first sensing layer and a second sensing layer without a shielding layer.

15. The touch sensing method according to claim 13, wherein the sensing control signal is generated according to a vertical synchronization signal, a horizontal synchronization signal, a red signal, a green signal or a blue signal.

16. The touch sensing method according to claim 13, wherein the sensing control signal indicates a start time of a frame according to a vertical synchronization signal, a horizontal synchronization signal, a red signal, a green signal or a blue signal.

17. The touch sensing method according to claim 16, wherein the sensing circuit determines the sensing periods according to the start time of the frame and detects the sensing signal within the sensing periods.

18. The touch sensing method according to claim 13, wherein the sensing control signal is synchronized with the common voltage (Vcom) signal.

19. The touch sensing method according to claim 13, wherein the sensing control signal is associated with a video synchronization signal.

* * * * *